(12) United States Patent
Bouet

(10) Patent No.: US 7,043,548 B2
(45) Date of Patent: May 9, 2006

(54) DOWNLOAD STATUS INDICATORS IN WIRELESS SHORT RANGE DEVICES

(75) Inventor: Stephane Bouet, Tokyo-To (JP)

(73) Assignee: Nokia Corporation, Espoo (FI)

( * ) Notice: Subject to any disclaimer, the term of this patent is extended or adjusted under 35 U.S.C. 154(b) by 945 days.

(21) Appl. No.: 10/027,303

(22) Filed: Dec. 20, 2001

(65) Prior Publication Data

US 2002/0093923 A1    Jul. 18, 2002

(30) Foreign Application Priority Data

Dec. 22, 2000    (FI) .................................. 20002854

(51) Int. Cl.
*G06F 13/00*    (2006.01)
(52) U.S. Cl. ...................... 709/224; 709/219; 709/232; 719/328
(58) Field of Classification Search ................ 709/206, 709/217, 219, 223, 224, 227, 232; 719/328, 719/329
See application file for complete search history.

(56) References Cited

U.S. PATENT DOCUMENTS

| | | | |
|---|---|---|---|
| 5,657,450 A * | 8/1997 | Rao et al. ...................... 707/10 |
| 5,953,010 A * | 9/1999 | Kampe et al. ............... 715/772 |
| 6,072,784 A * | 6/2000 | Agrawal et al. ............. 370/311 |
| 6,363,419 B1 * | 3/2002 | Martin et al. ................ 709/219 |
| 6,377,978 B1 * | 4/2002 | Nguyen ....................... 709/206 |
| 6,639,687 B1 * | 10/2003 | Neilsen ...................... 358/1.14 |

FOREIGN PATENT DOCUMENTS

| | | |
|---|---|---|
| EP | 0594199 A1 | 4/1994 |
| EP | 0980168 A2 | 2/2000 |

OTHER PUBLICATIONS

Communication from Finnish Patent Office dated Feb. 4, 2002.

* cited by examiner

*Primary Examiner*—Viet D. Vu
(74) *Attorney, Agent, or Firm*—Morgan & Finnegan, LLP

(57) ABSTRACT

The invention discloses a method of sending a download status indicator 320 depicting the status of a data transfer between a sending device and a receiving device. The invention is suitable for use with short range radio communication technologies including Bluetooth short range connection technology. In an embodiment of the invention, the invention is employed within a Bluetooth information Kiosk environment. In the embodiment, a Kiosk 100 establishes a connection 300 with a plurality of handheld devices (102, 103,104) using the Object Exchange (OBEX) protocol. The download status indicator is estimated, for example, by the Kiosk 100 from models generated from usage statistics collected from previous data transfers. The download status indicator and related information is sent in an Application Parameters header 310 comprising of a plurality of triplets and is updated repeatedly in subsequent Application Parameters headers. The download status indicator is represented in picture format and takes the form of, for example, a progress bar displayed on the receiving device depicting the amount of data successfully downloaded.

19 Claims, 4 Drawing Sheets

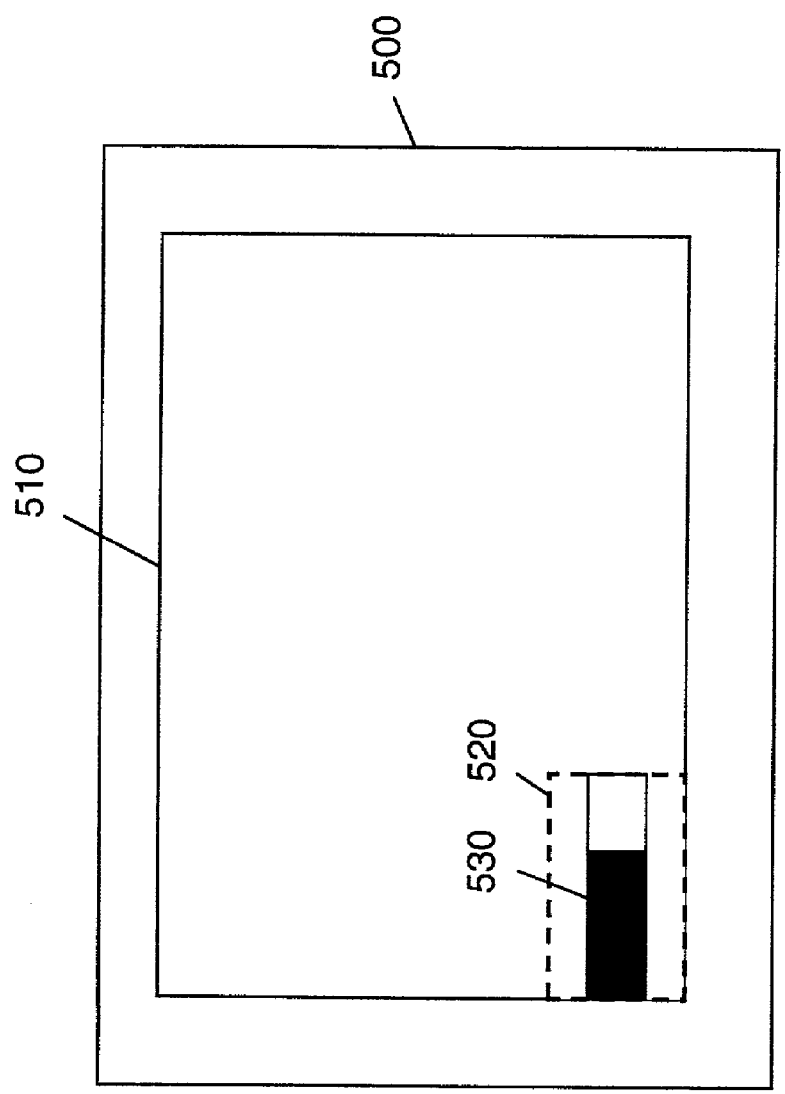

US 7,043,548 B2

DOWNLOAD STATUS INDICATORS IN WIRELESS SHORT RANGE DEVICES

FIELD OF INVENTION

The present invention relates generally to wireless short range systems and, more particularly, to a method and system for estimating and sending download status indicators to wireless short range devices.

BACKGROUND OF THE INVENTION

There have been various short range radio communications technologies used in the past that provide low cost (low power) communications. Some examples include Radio Local Area Networks, Mobile Radio Data, Paging Devices and some low power applications such as Remote Meter Reading and Video/Audio Transmissions. In spite of the benefits of these technologies, they largely remain confined to use in niche applications operating in select environments.

However, the concept of short range wireless communications has gained increasing interest in recent years. The popularity of handheld devices such as mobile phones and PDAs have fuelled the desire for connectivity between these devices and with computing resources such as wireless LANs. One solution that was developed to provide these types of connections using low power wireless links is Bluetooth. Bluetooth is a communications standard for short-range radio connections that allow communication with mobile devices in an ad-hoc fashion. Bluetooth enables voice and data transfer between communication devices and computing devices within a range of about 10 to 100 meters. Since it is based on radio technology, a significant advantage is that it allows for the elimination of cables that normally connect devices to be replaced by a universal short-range radio link. And due to its RF nature, the devices do not need to be within line-of-sight of each other which allow connections through walls or other non-metal objects, as opposed to infrared. This enables mobile phones to be especially suitable for use with Bluetooth where they could, for example, operate as a modem for a laptop or PDA to further enhance mobility.

One type of application for Bluetooth that is attracting significant interest is the use of so-called Bluetooth-enabled information kiosks. A Bluetooth Kiosk can be used to broadcast local information that can be received by Bluetooth-enabled devices, such as a phone or PDA, when the come into range. By way of example, a public Bluetooth Kiosk may be installed in a shopping mall to allow people to have quick access to information related to the stores in the mall or installed in an airport terminal to provide gate and flight information to travelers in convenient way. Other applications may be in the field of advertising where a user passing by a store can be beamed information on sales or store opening hours directly to his handheld device. Still further applications may support e-business operations such as purchases from a kiosk e.g. lottery tickets, snacks etc. An advantage of the wireless information kiosk is that it allows multiple users to access information simultaneously and remains available even when the user leaves the coverage area of the Kiosk.

For a user on the receiving end of a lengthy download, it is often convenient to know the status of the download and the time remaining to complete the transfer. By way of example, data transfers in popular applications, such as web browsers, typically show a status indicator on display in the form of a progress bar which when a transfer is in progress. The bar typically shows the percentage of kilobytes of a web page, document, or images that have been successfully downloaded. The status indicator also provides the user feedback on the state of the transfer i.e. connection speed or whether the connection has been terminated, for example. However, at times when the Kiosk is serving numerous users simultaneously with downloads coupled with the randomness of users passing by the Kiosk which trigger the downloads, makes it difficult to calculate accurate estimates for the remaining download times for the associated devices.

Although the problem of accurately estimating and transmitting download status indicators was highlighted by operating in the Bluetooth short range communication environment, and specifically in connection with a Kiosk application, the problem also exists in other short range communication standards and in other applications where download operations occur. In view of the foregoing, it is an objective of the present invention to provide a technique for improving the accuracy of estimating the remaining download times and sending download status indicators to receiving devices engaged in download operations.

SUMMARY OF THE INVENTION

Briefly described and in accordance with an embodiment and related features of the invention, in a method aspect there is provided a method of indicating the status of a download for display on a receiving device during a wireless data transfer comprising a plurality of packets between a sending device and the receiving device, the method being characterized in that a plurality of status indicators are transmitted with the data packets associated with the data transfer.

In a system aspect there is provided a system for sending a download status indicator depicting the download status of a data transfer, the system comprises:

a sending device for transmitting data;

a receiving device for receiving data from the sending device;

a collector for collecting statistical parameters of data transfers between the sending device and the receiving device;

an analyzer for analyzing the statistical parameters for use in developing predictive models for calculating estimates for the download status indicator; and a transmitter for sending the download status indicator from the sending device to the receiving device for display on the receiving device.

BRIEF DESCRIPTION OF THE DRAWINGS

The invention, together with further objectives and advantages thereof, may best be understood by reference to the following description taken in conjunction with the accompanying drawings in which:

FIG. 5 shows an exemplary download indicator displayed on a receiving device in accordance with an embodiment of the invention.

DETAILED DESCRIPTION OF THE INVENTION

Figure 1:
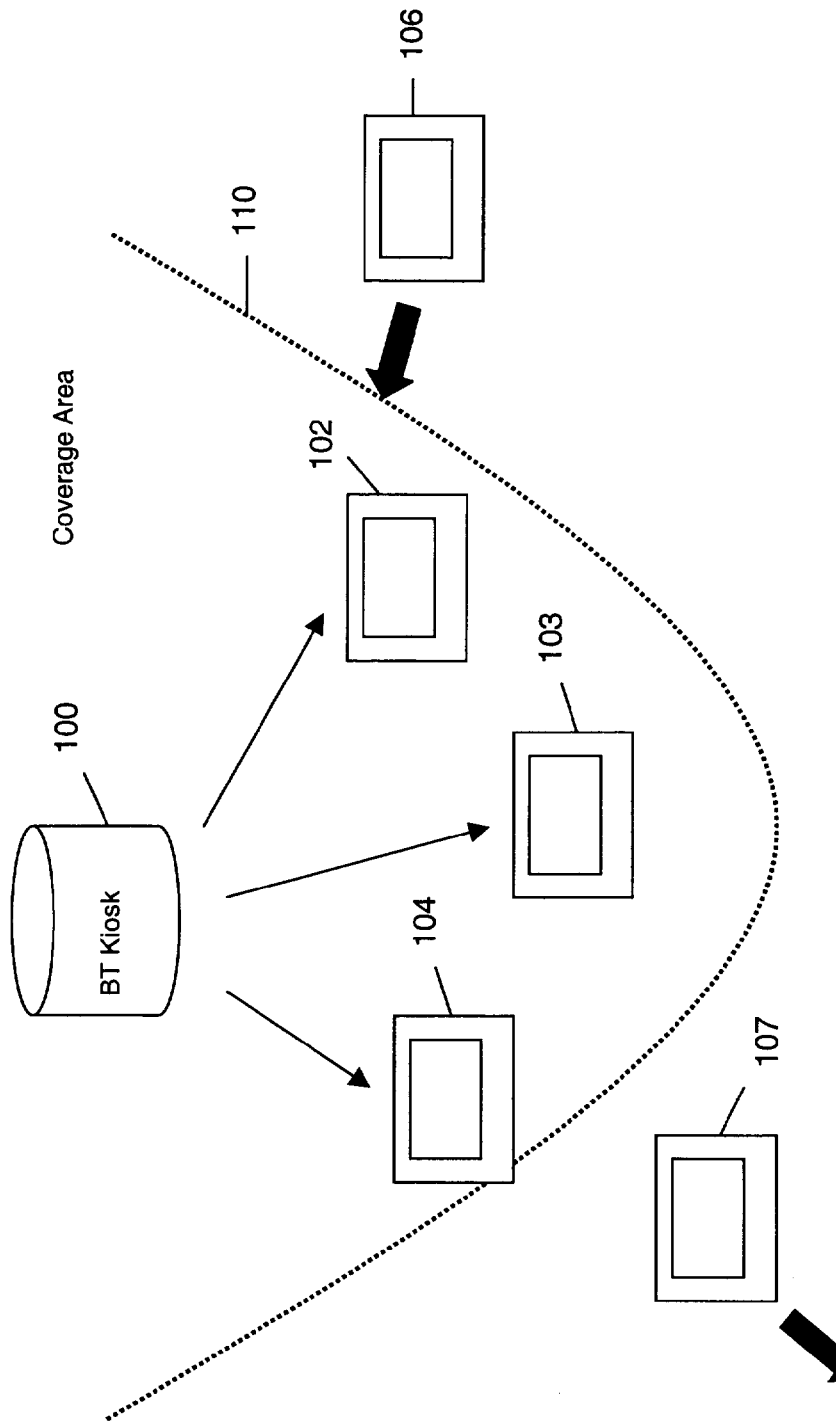
FIG. 1 shows a Bluetooth kiosk arrangement for downloading information to a plurality of handheld devices.

FIG. 1 shows a Bluetooth Kiosk arrangement that illustrates the transmission of information to several handheld devices that come within range of the Kiosk. A Bluetooth kiosk (BT Kiosk) 100 assumes the role of "master" device in a Bluetooth piconet. A piconet is the feature of the Bluetooth specification that allows for networking among devices over radio connections in a point-to-multipoint network with up to seven "slave" devices. It should be noted that a piconet can be a point-to-point connection between two devices as well. Kiosk 100 is able to establish a connection and download information to Bluetooth-enabled devices 102, 103, and 104 that are within the Kiosk's coverage area, as represented inside boundary line 110. No connections are established between the Kiosk 100 and approaching device 106 and exiting device 107, as they are outside the coverage area.

One of the noteworthy aspects of Bluetooth piconets is the relative freedom given to the master of a piconet to schedule the sending of packets to the various slaves that it is serving in the piconet. As a result, the effective data rate of the link between a given slave device and the master device is susceptible of great variations over time. These variations may be a function of the number of slave devices the master device is serving at a given time and the number of inquiries or pages the master is performing, for example. Consequently, when transmitting information in a downloading operation, it is very difficult for a given slave device to calculate a good estimate of the remaining downloading time needed to complete the data transfer. This can also be the case even when the receiving device knows, for example, the total amount of data to be transferred, the amount of data successfully downloaded, and the current load level statistics.

As alluded to earlier, the master of the Bluetooth piconet is responsible for calculating estimates of the remaining time that is required to complete downloads in data transfers between him and each of the receiving devices. Moreover, the master is responsible for sending calculated estimates of the download status in pictorial form to those receiving devices whose primary function is to display content. The estimates are typically calculated by the master by using, among other parameters, load level statistics and total download size. Estimates for a particular receiving device can prove to be at times inaccurate and unreliable, especially in heavily dynamic situations where the master device is dealing with tasks associated with many receiving devices. Accurate calculations by the master device is especially important since some receiving devices have very little processing power where even the calculation of the remaining amount of data could be a challenge. Some examples include e-books and other devices that are especially tailored for the display of pictorial or textual content, which do not have the resources to perform additional computational tasks.

In short range communication technologies that have data transfer capabilities, data transfers or downloading operations are typically governed by a data transfer protocol. Data transfer protocols provide data handling and ensure accurate transport of a data stream from a sending device to a receiving device. In one such communication technology such as Bluetooth, the data transfer protocol used for transferring data between devices is the Object Exchange (OBEX) protocol. OBEX is a session protocol that was originally specified by the IrDA (Infrared Data Association) for transporting objects over infrared connections. OBEX can be characterized as a binary equivalent to the HTTP protocol thus, because of its binary encoded nature enables the transfer of graphical content over links with limited bandwidth such as in Bluetooth. The protocol does not specify a top or bottom API thereby making it very flexible in that it can run over transport layers such as TCP/IP, in addition to Bluetooth baseband radio transmission channels. For a more complete description of the OBEX protocol the interested reader may refer to "IrDA Object Exchange Protocol IrOBEX", version 1.2, Counterpoint Systems Foundry, Inc., Mar. 18, 1999.

Figures 2, 4:
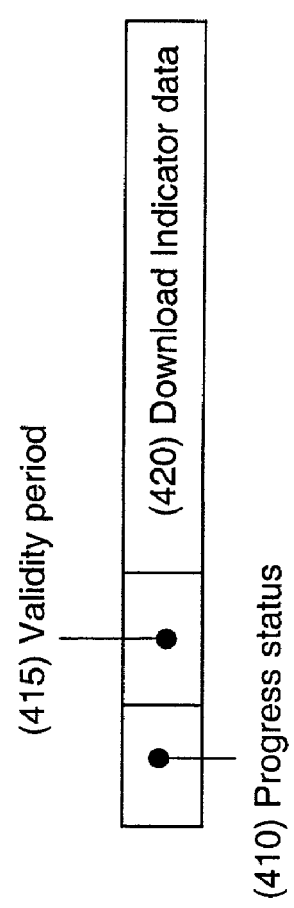
FIG. 2 illustrates the general structure of an OBEX request packet.
FIG. 4 shows an exemplary triplet containing a downlink indicator transported in accordance with an embodiment of the invention.

FIG. 2 illustrates the general structure of an OBEX request packet. Each request packet comprises of an opcode in Byte 0 such as a 'PUT' command (send content) or 'GET' command (retrieve content). In bytes 1 and 2 is the packet length in bytes, and in bytes 3 and on are one or more headers. Examples of headers include a name of file, length of file, and date which are typically followed by the object body (file data). A header must fit into a single request packet, although segments of data may be split over several packets, provided that, in each packet, the segment of data is preceded by a Body header. An Application Parameters header (AP header) is used by applications (and protocols) layered above OBEX to convey additional information in a request or response packet. In a request such as a 'PUT', the AP header typically contains several parameters or modifiers. A Tag-Length-Value encoding scheme is used to support a variety of request/response types or levels. An AP header may contain any number of tag-length-value triplets required for the download.

In accordance with an embodiment of the present invention, an improved estimation of the remaining download time of a data transfer is performed by, for example, a Bluetooth kiosk in a manner that may take into account the current data throughput on the channel connection with the slave receiving device, the current topology of the piconet, the scheduling of its interactions with the other active or parked slave devices, and the statistics it has gathered on the access patterns, etc.

The intelligence lays in the Kiosk in that it provides each of its slave devices that are performing download operations with accurate information as to the status of the current operation. A download indicator for the remaining time is calculated using parameters that include the current data throughput, the total size of the transfer, the amount of data successfully downloaded. Information from statistical parameters are also used in the calculation. The Bluetooth Kiosk keeps detailed tracking of its activity during a day, a week and is either fitted with or produces models of the general access patterns during a day, a week, month etc. These models are used to provide a projection of the Kiosk load during a specified period of time.

In collecting the statistics, a significant task of the Bluetooth Kiosk is to try to recognize access patterns as a function of the time of the day, the day of the week, and time of the month. By way of example, a kiosk in a shopping mall may develop a usage model based on a finding that most downloads occur during the day at lunch time or in the evening when people are getting off work. Similarly, a weekly model may find that the heaviest traffic occurs during the weekend with Saturday in particular being the most busy. Furthermore, a monthly model may show that increased traffic tends to occur around the days following payday, for example. The use of the statistical parameters collected over time leads to predictive models that are able to more accurately forecast the Kiosk load at a given time. This in turn leads to improved accuracy in calculating the downloading time estimates for each particular device.

The predictive models may be generated for extrapolating the total duration of each download operation may vary considerably according to each implementer but some guidelines have shown to be useful. By way of example, the total bandwidth available for data download is obtained by assessing the relative durations of user data transport versus inquiry and paging activities. Inquiry activities are characterized by a timeout that indicated the number of slots the inquiry operation will last. This timeout multiplied by the number of inquiry operations per second gives the number of slots per second used for inquiry purposes. The number of inquiry operations per second is function of the pace of changes in the environment where this pace is highly dependent on each environment (e.g. the changes will be very fast on a train station platform and much slower in a stationary environment such as in a barber shop) and can be complemented with statistical prediction, based on recordings.

In calculating the bandwidth, the bandwidth available for data downloading is the raw bandwidth minus the bandwidth necessary for inquiry operations. The available bandwidth must then be divided between the slaves that are simultaneously using the system. There are various alternatives for which the implementer may pursue. For example, after each download operation, a slave may be placed in park mode. In this case, the bandwidth is simply divided by the number of remaining active slaves. Another alternative may be to leave the slaves in the active mode for some time after the completion of a download operation while offering them the ability to immediately request for another download after a limited amount of time sparing them from having to switch modes. In this case, the master is free to decide the frequency at which it polls the active slaves not currently engaged in a download operation to check whether they issued a request. The bandwidth available for each download operation can then be allocated by considering the number of active slaves currently engaged in download operations and the number of those that are not, with the idea of allocating more bandwidth to the devices of the former.

Using a good model to calculate a download estimate, the estimate is converted to a binary picture format such as JPEG and GIF depending on the support encoding on the slave device. It should be noted that any binary based picture format compatible for transport with the OBEX protocol can be used with the invention such as JPG2000, PNG, TIF, EXIF or AVI.

The maximum size of the pictorial information is the size of the area where downloading status information is to be displayed on the device. If the pictorial downloading status information received corresponds to an image of smaller size, this pictorial information is displayed in the center of the area dedicated to downloading status information, thus giving a superimposition effect. The range of possible sizes for the downloading indicator allows for product or application differentiation. The picture based download indicator is then carried in the Application Parameters header of the OBEX frames that are already being used to download the user data. This allows the download indicators to be delivered in parallel with the primary downloading operation for display on the receiving device.

Figure 3:
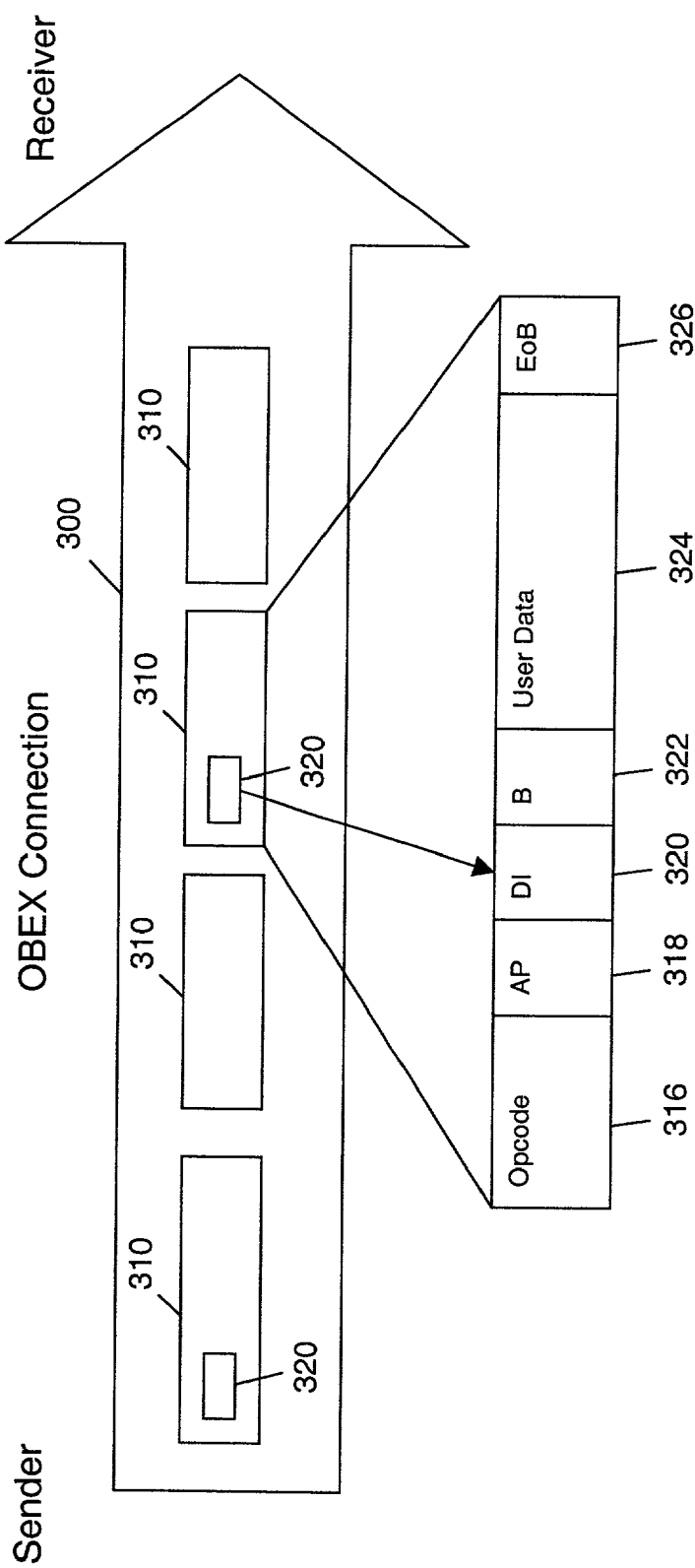
FIG. 3 shows a schematic representation of an OBEX connection from a sending device to a receiving device in accordance with an embodiment of the invention.

FIG. 3 shows a schematic representation of an OBEX connection from a sending device to a receiving device in accordance with an embodiment of the invention. The invention is suitable for use with low-level devices that are specialized for display purposes e.g. e-books. When a suitable device enters the coverage area of the Kiosk, a download operation automatically commences by establishing an OBEX connection 300 with the device. Within the connection, the download status indicators 320 in picture format are carried in the OBEX frames 310 being sent to the receiving device during the connection. Shown in more detail is an expanded view of an exemplary OBEX frame 310 that includes an AP header used in the connection.

The header is comprised of fields containing the opcode 316, an Application Parameters header 318 which contains the picture content (JPEG, GIF etc.) of the downlink indicator, a Downlink Indicator field 320 which signifies that the triplet contains download indicator data, a Body header 322, followed by the User Data 324 e.g. data sent from the Kiosk to the receiver, and an End-of-Body header 326. A End-of-Body header 326 replaces the Body header in the last frame i.e. when the header carries the last chunk of the user data. The OBEX frame fields are based on a triplet configuration i.e. further subdivided into fields consisting of tag-length-value where the data for download indicator is transported within the triplets.

FIG. 4 shows an exemplary Applications Parameters Header, in accordance with an embodiment of the invention, comprising three triplets for the downlink indicator data transported in accordance with an embodiment of the invention. Field 410 contains the tag-length-value (TLV) parameters for the "progress status" of the download i.e. tag for progress status, length of progress status triplet, and progress status value. The "progress status" is a value that represents the amount of data that has been successfully downloaded at the time the calculation of the current download indicator is performed. Field 415 contains TLV parameters for the "Validity period" which gives the period of time after which the download indicator should be considered as not valid. It is up to the receiving device to decide what to do after the validity period but it is usually recommended that the download indicator be erased from the screen, even when there is no immediate replacement. Field 420 contains the TLV parameters for the download indicator image data in picture format.

Once the download indicator graphic is received by the receiving device it is typically displayed in a allocated usage area on the screen. In order to allow for different variations in the form the downloading indicators, a subwindow is defined in which downloading indicators are displayed. The download indicators can take on a variety of forms to convey to the user the download status of a transfer. By way of example, a very common and intuitive representation is a progress bar that steadily expands in as the transfer progresses. Another type of representation that may be depicted in the subwindow is a simple numerical display denoting the percentage of data that has been successfully downloaded.

FIG. 5 shows a download indicator displayed on a receiving device 500 in display area 510 in accordance with an embodiment of the invention. A subwindow area 520 is allocated for the display of status indicator in the lower left hand corner of the screen. A status indicator in the form of a progress bar 530 may be displayed with the subwindow 520. The subwindow can be fully occupied by the indicator or, if the indicator is of smaller size, it can be displayed in the center of the subwindow 520, as shown. The range of possible sizes for the downloading indicator enables products that have different display sizes such as mobile phone versus a PDA to display the indicator without problems. Moreover, the subwindow provides some flexibility in that applications can make use of the area as they see fit. While active, the indicator itself is superimposed against the backdrop of the main image being displayed on the screen.

It should be noted that the invention is not limited to use of Bluetooth but is applicable with any system that uses the OBEX protocol for data transfers such as infrared connections, for example. Beyond that, the download indicators are not limited to transport within the packet headers and can be transmitted in, for example, the data field of a data transfer. Furthermore, the inventive concept of transmitting download indicators can be included in a data transfer that includes non binary data by sending the status indicators in packets that are combined with the packets of the data transfer therefore allowing the use of transport protocols other than OBEX.

Although the invention has been described in some respects with reference to a specified embodiment thereof, variations and modifications will become apparent to those skilled in the art. It is therefore the intention that the following claims not be given a restrictive interpretation but should be viewed to encompass variations and modifications that are derived from the inventive subject matter disclosed.

The invention claim is:

1. A method for indicating the status of wireless downloads comprising:
    sensing current conditions including a plurality of receiving devices in proximity to an information source;
    determining an estimated download time for each of the plurality of receiving devices based on sensed current conditions input into a predictive model;
    sending a plurality of data packets between the information source and the plurality of receiving devices via short-range wireless communication, wherein a plurality of status indicators based on the estimated download time for each of the plurality of receiving devices are transmitted with the plurality of data packets.

2. The method according to claim 1, wherein the data packets include at least data packet headers and data packet information defined in accordance with a transfer protocol, the plurality of download status indicators being transmitted within the packet headers of the data transfer.

3. The method according to claim 2, wherein the data packet headers includes at least an operation code field used to identify the packet, an application parameters field containing a download status indicator picture, and a data field that includes the data for the data transfer.

4. The method according to claim 3, wherein the application parameters field includes at least a Progress Stamp for indicating the amount of data successfully downloaded to each receiving device, a Validity Period for indicating the period of time the status indicator is valid, and the picture data for the download status indicator.

5. The method according to claim 1, wherein the source device transmits data to the plurality of receiving devices in a Kiosk environment.

6. The method according to claim 3, wherein the download status indicator transmitted to each of the plurality of sensed receiving devices is displayed in the form of a progress bar that expands to accurately reflect the percentage of data successfully downloaded to a particular receiving device.

7. The method according to claim 3, wherein the source device collects statistics on data transfers with the plurality of receiving devices for use in developing the predictive models for calculating estimates for the download status indicator.

8. The method according to claim 1, wherein a Bluetooth Kiosk environment including the source device performs the wireless data transfer to the plurality of receiving devices using the Object Exchange (OBEX) protocol.

9. A system for indicating the download status of wireless data transfers comprising:
    a source device for transmitting data via short-range wireless communication;
    a plurality of receiving devices for receiving data from the sending device;
    a transmitter and receiver in the source device for sensing when the plurality of receiving devices are in proximity to the source device and for establishing a short-range wireless network including the plurality of receiving devices;
    a collector in the source device for collecting statistical parameters including at least data transfers between the source device and the plurality of receiving devices;
    an analyzer in the source device for analyzing the statistical parameters for use in developing predictive models for calculating estimates for download status indicators for each of the plurality of receiving devices; and
    the transmitter in the source device further sending the download status indicators from the source device to each of the plurality of receiving devices for display on each of the receiving devices.

10. The system according to claim 9, wherein the source device and the plurality of receiving devices are configured in Master-Slave hierarchical relationship whereby the source device is the Master and the plurality of receiving devices are the Slaves.

11. The system according to claim 10, wherein the source device is an information Kiosk for disseminating data and the plurality of receiving devices are wireless handheld devices with a graphics capable display.

12. The system according to claim 9, wherein the collection and analyzing means are contained within the hardware structure of the source device.

13. The system according to claim 9, wherein, the statistical parameters are kept in an activity log containing information related to previous data transfers by occurring for a time of day, a day of week, and a time of month.

14. The system according to claim 9, wherein each of the download status indicators is in a picture format such as JPG, JPG2000, GIF, PNG, TIF, EXIF or AVI.

15. The system according to claim 11, wherein each of the download status indicators is displayed on each of the wireless handheld devices in the form of a progress bar.

16. The method according to claim 1, wherein the sensed current conditions include at least one of the amount of information to be downloaded to each receiving device, the current time and the current date.

17. The method according to claim 1, wherein the sensed current conditions include at least one of the number of receiving devices currently connected to the source device, the communication abilities of each receiving device currently connected to the source device and the current communication activity mode of each receiving device currently connected to the source device.

18. The system according to claim 9, wherein the predictive model has as inputs at least one of the amount of information to be downloaded to each receiving device, the current time and the current date.

19. The system according to claim 9, wherein the predictive model has as inputs at least one of the number of receiving devices currently connected to the source device, the communication abilities of each receiving device currently connected to the source device and the current communication activity mode of each receiving device currently connected to the source device.

* * * * *